April 23, 1968 T. A. BANNING, JR 3,379,825

SUBSCRIPTION TELEVISION SYSTEM HAVING RASTER DISTORTION

Filed July 16, 1964 3 Sheets-Sheet 1

Fig. I.

Inventor:

Thos. A. Banning, Jr.

SUBSCRIPTION TELEVISION SYSTEM HAVING RASTER DISTORTION

Filed July 16, 1964 3 Sheets-Sheet 2

Thos. A. Banning Jr

SUBSCRIPTION TELEVISION SYSTEM HAVING RASTER DISTORTION

Filed July 16, 1964 3 Sheets-Sheet 3

Inventor:
Thos. A. Banning, Jr.

3,379,825
SUBSCRIPTION TELEVISION SYSTEM HAVING RASTER DISTORTION

Thomas A. Banning, Jr., 5500–5520 S. Shore Drive, Apt. 1408, Chicago, Ill. 60637

Filed July 16, 1964, Ser. No. 383,144
9 Claims. (Cl. 178—5.1)

ABSTRACT OF THE DISCLOSURE

This case discloses a television system whereby the program may be emitted and received with improper lateral shifts of the scans, producing an intelligible but less than perfect translation in conventional receivers; or such emitted program signals may be received by pay or subscriber receivers, with correction of such lateral shifts of the scans, to produce a superior aesthetic quality translation of the program; the former less than perfect reception and translation, being a free program—the latter, corrected program, being a pay or charge received program.

Figure 1:
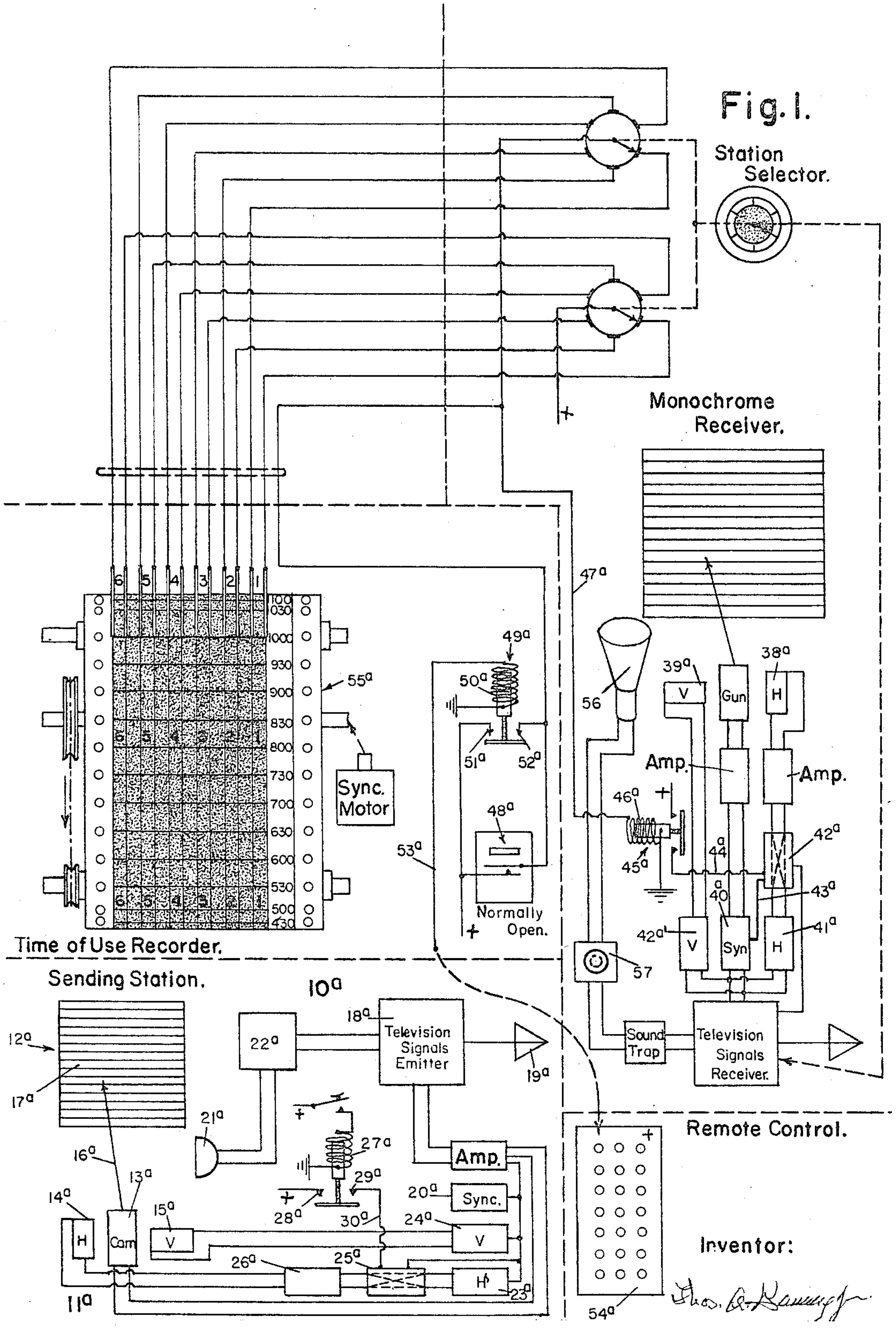

This invention relates to improvements in television systems and operations. These improvements are usable in connection with television systems operating on either the so-called "Monochrome" translation principle, or the "Color" translation principle, and I have hereinafter illustrated and described embodiments of structure and circuitry adapted to operation according to both of said principles of translation. In this connection I have also illustrated and shall describe embodiments operating according to the full color lineation scan principle and also according to the three color dot array principle, by way of illustration of the applicability of the present improvements to all said principles of translation.

An important object of the present invention is to provide an operation or operations adapted to use in connection with, or as a portion or portions of the equipment and operations disclosed in various patents and applications for patents filed by me, and relating to subscription or pre-pay television operations. One such previously issued United States patent is No. 3,070,652, issued to me Dec. 25, 1963. Various divisional applications based on the said issued patent, and other pending applications already pending or under preparation, disclose systems and structures and circuitry with which or in substitution for which, the hereinafter disclosed improvements may be used.

Briefly stated, the present improvements include the provision of means and circuitry whereby some scans of each "frame" of a raster produced by the translation of the received signals may be translated in either the same direction across such raster as the other scans of such raster, or in direction opposite to that in which such other scans are produced, selectively. Thus, for example, if the scans produced during the translation of the "Main" field of the "Frame" are by scanning from left to right of the raster, then, by use of the hereinafter disclosed features, the scans produced during the translation of the "Interlace" field may be by scanning from right to left of the raster. Whether such opposition of direction of scanning of the two fields will produce a raster which is fully intelligible to the viewer will depend on the directions in which the scans of the "Camera" used at the sending station (or the scans of the recorded picture) from which the video signals emitted by such sending station, were produced or recorded. Thus, if alternate fields of signals emitted by the sending station are scanned in the same direction, and if the corresponding fields of signals are received and translated by a receiver, also both in the same direction, the translation and raster thus produced will be fully intelligible and correspond to the appearance of the object being replicated. On the contrary, if the alternate fields of the signals emitted by the sending station are scanned in opposite directions (e.g., main fields from left to right, and interlace fields from right to left), then, if both the main and interlace fields translated and produced in the raster of the receiver, are scanned in the same direction as each the other, an incorrect and less than perfect translation of the picture will be produced on the viewing screen of the receiver. But, if under the assumed conditions of scanning of the alternate fields at the sending station, in opposite directions, and emition of signals corresponding thereto, the equipment and circuitry of the receiver, be modified to produce the scans of the alternate fields translated by such receiver, in opposite directions, then the raster produced by such operation of that receiver will be a correct and fully intelligible translation corresponding to the object being replicated.

It is an object of the present invention to produce equipment and circuitry in both the sending station and the receiver, such that the directions of scan of the alternate fields may be changed from time to time in either or both such sending station and receiver, to produce either harmonious translation of the alternate fields at the receiver as compared to the succession of scanning of the fields at the sending station; or to produce nonharmonious translation of the alternate fields at the receiver as compared to the succession of scanning of the fields at the sending station. For accomplishing these results I have provided switching or other means to successively reverse the scannings of the fields at the two locations, together with means to control such switching means at the two locations—the sending station and the receiver. Such control means at the receiver may also take the form of pre-pay or remote control elements, as disclosed in various embodiments shown in said Patent No. 3,070,652, and also various embodiments disclosed in certain of said co-pending applications, some of which are divisions of said Letters Patent, and others of which are original. If desired, provision may also be made for recording the times and intervals of use of the receiver operations, as hereinafter disclosed, and also as disclosed in such patent and applications.

Although I have herein shown and shall describe an embodiment in which the reversals of direction of scan are produced corresponding to successive fields of scan, so that such reversals thus occur twice during production of each complete frame of the picture, still it will be understood that such reversals may, as alternate embodiments of the invention, be produced every other scan or every other group of a determined number of scans, provided that the reversals produced at the receiver correspond to those produced at the sending station. Thus, if the reversals at the sending station are produced every scan, or, for example, every ten scans, then the equipment at the receiver should also be designed and constructed to produce the receiver reversals harmoniously with the sending station reversals. The following comments respecting such reversals are also pertinent:

Generally the direction of scan of a field translated in the receiver and produced on the raster, should be the same as the direction of the correspondingly being produced scanning by the sending station. Then, as each rightwardly scanning operation is produced at the sending station, the field produced in the receiver will also be rightward scan, and as each leftwardly scanning operation is produced at the sending station, the field produced in the receiver will also be by leftward scan, on the assumption that a fully intelligible translation is being produced by the receiver. Likewise, if all of the fields scanned at the sending station are thus scanned in the same direction (e.g., rightwardly), then all of the fields scanned at the receiver should be in a given direction, either rightwardly or leftwardly, as selected. If they are all scanned in the same direction as the direction of scanning at the sending station, then the raster produced at the viewing screen of the receiver will not only be full intelligible, but it will also be a "right-hand" translation—that is, facing in the same direction as the object which is being replicated. On the contrary, if all of the fields scanned at the receiver are scanned in a stated direction, which however is opposite to the direction of scanning at the sending station, then a fully intelligible translation will be produced on the viewing screen of the receiver, but facing in direction opposite to that of the object being replicated.

It will now be evident that when provision is made for producing and emitting from the sending station, video signals corresponding to the scanning of an object according to a selected spatial and time pattern, and when the scanning produced by the equipment of the receiver is constituted and operated to produce scanning for production of a raster with the scans always corresponding directionally to the same directional pattern as that of the scanning at the receiver (or always in direction opposite to the direction of scan at the sending station), and with the successive receiver scans produced on the same time pattern as the time pattern of the scans at the sending station, a fully intelligible translation will be produced. (If the direction of scanning in the receiver is always opposite to the direction of scanning at the sending station, the picture produced at the receiver will face opposite to the facing direction of the object being replicated.) On the contrary, if the equipment of the receiver is not constituted and/or operated to cause the scans at the receiver to simultaneously follow changes in the spatial pattern of the scans at the sending station, then the raster produced at the viewing screen of the receiver will be less than fully intelligible.

The equipment hereinafter disclosed and described is so constituted that under normal conditions of operation the sending station will emit signals corresponding to a pre-determined spatial and time pattern of scanning, and such that the receiver will also translate and produce scanning corresponding to such spatial and time pattern, so that during the emitting of video signals for a stated program the receiver will receive and translate such video signals to produce a translation of spatial form corresponding at all times to the spatial pattern of the video signals being thus emitted. Thus, during the emitting of the video signals for such program, the receiver will receive and translate said signals without need of change of the equipment or circuitry of such receiver, to produce a fully intelligible translation of the program being thus emitted. The equipment herein disclosed is further provided with means to enable change of the spatial pattern of successively emitted scan signals or groups of scan signals so that such scan signals emitted when such changes means is made effective, the spatial pattern then being produced by the sender will not correspond to the normal spatial pattern still being produced by the equipment and operational condition of the receiver. Accordingly, certain scans of the receiver translation will correspond directionally to the direction of the corresponding scans produced at the sender; but others of the scans produced in the receiver translation (still being the normal direction of such scans) will be opposite to the changed direction of the corresponding scans of the sender. Thus a translation will be produced in the receiver, which translation includes corectly directed scans and incorrectly directed scans, with corresponding less than perfectly intelligible translation of the raster.

The receiver is, however, also provided with means to reverse the directions of the scans which correspond to the directionally changed scans produced and emitted by the sender; so that, although the spatial pattern of emission of the scans by sender has been changed, a corresponding change in the spatial pattern of translation by the receiver is now produced, with correction of the raster produced at the receiver to produce a fully intelligible raster corresponding to the object being replicated. Such means to reverse the direction of scans of the receiver, which scans correspond to reversed direction scans at the sender, includes pre-pay means or remote control means, in case the equipment is used in connection with operations of the "Subscriber" or "Pre-pay T.V." type.

Specifically, I have shown such aforementioned features and equipment in connection with sending station equipment constituted to emit conventional "Monochrome" or black and white signals, and receiver constituted to receive and translate such signals by a single-gun operation; also equipment in connection with the sending station constituted to emit conventional "Color" signals according to the three color dot array principle, and receiver constituted to receive and translate such signals in color by use of a single-gun operation; and also equipment in connection with the sending station constituted to emit conventional "Color" signals according to the three color dot array principle, and receiver constituted to receive and translate such signals in color by use of a single-gun operation.

Other objects and uses of the invention will appear from a detailed description of the same, which consists in the features of construction and combinations of parts hereinafter described and claimed.

Figure 2:
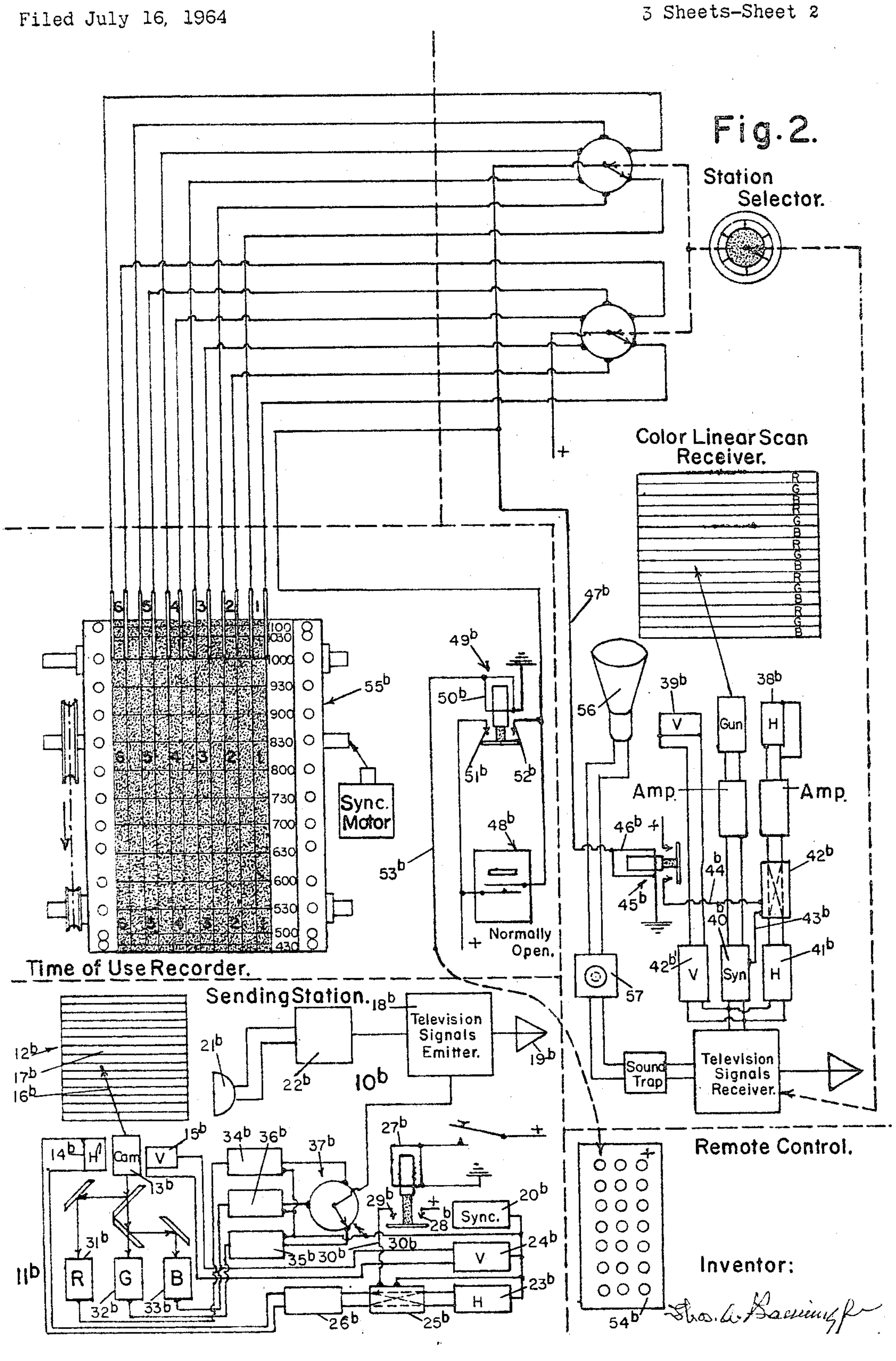
Figure 3:
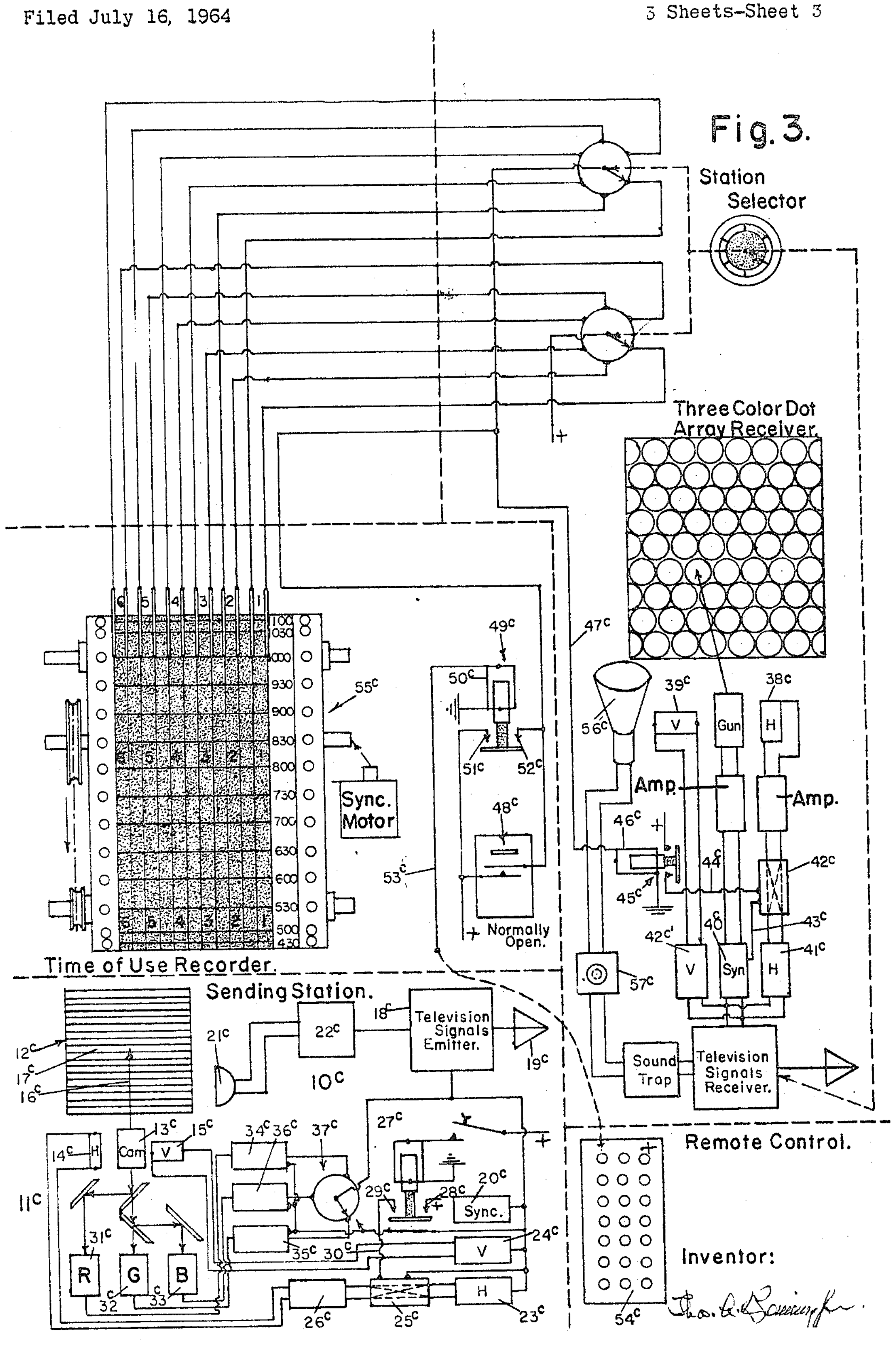

In the drawings:

FIGURE 1 shows schematically, a sending station provided with means to produce, for alternate scans or groups of cross scans, reversals of direction of such scans or groups of scans, under control of synchronizing means in the sender, to thus produce and emit video signals corresponding to such regularly changing directions of scan, together with switching or other suitable means for producing the desired reversals of direction of the scanning operations; and also shows, schematically, a single gun receiver which is provided with means to produce changes of direction of the horizontal or cross scans under control of synchronizing means in the receiver, activated by synchronizing signals emitted by the sender, with production of the scan translations in the receiver corresponding to the directions of the scan operations and the video signals, emitted by the sending station, and including means in the receiver to cause the directions of scan translations in the receiver to match the directions of the corresponding scans produced and signals emitted by, the sender;

FIGURE 2 shows, also schematically, a system comprising a sending station and a receiver, provided with the means to produce reversals of the produced scans, and matching reversals of the received signals and the scans produced corresponding thereto; wherein the sending station is provided with means to produce and emit the video signals in three color operations, and the receiver is provided with means to produce the color raster by a single gun operation, and with cross scanning operations progressively reversed to match the reversals of the directions of scan produced in the sending stations and signals emitted thereby; and FIGURE 3 shows, also schematically, another system comprising a sending station and a receiver, provided with means to produce reversals of the produced scans, and matching reversals of the received signals and the scans produced corresponding thereto; wherein the sending station is provided with means to produce and emit the video signals in three color operations, and the receiver is provided with means to produce the color raster according to the three color dot array principle, by use of suitable gun means, being, specifically, a single gun arrangement.

In the drawings I have shown, in each case, schematically, a simple form of sending station and a single receiver constituted to receive and translate the video (and audio) signals emitted by such sending station. Since all of these showings are similar except insofar as is necessary to meet the particular conditions imposed by the basic form of the video production to be produced (either monochrome, or linear color line for color translation, or three color dot array), I shall first describe the three embodiments as a group which includes substantially the same components in all of the forms, and shall then describe the specially provided components for each embodiment. In so doing I shall also use the same identifying numerals for like components in the three embodiments, but with the suffixes *a*, *b* and *c* in the FIGURES 1, 2 and 3, respectively. Thus, In each figure there is provided a sending station 10 which includes the camera 11 shown facing the object to be televised, shown at 12. Each of such cameras includes the scanning unit 13 whose scanning beam is deflectable horizontally by the deflecting means 14 and vertically by the deflecting means 15. In each case the scanning beam is shown by the line 16. The horizontal deflecting means 14 produces the lateral or horizontal deflections to scan along the imaginary lines 17 of the object, with such scans proceeding laterally between one edge of the object and the other; and according to presently conventional specifications, such scans include 525 scans per "Frame," included in 263 scans for the first or "Main" Field, and 262 scans for the "Interlace" Field. Conventionally at the present time all such scans for both fields are executed in one horizontal direction—e.g., left to right when viewed as in the FIGURES 1, 2 and 3. The successive horizontal scans are executed at successively lower positions, with repetition of scanning, commencing at the top of the frame for the production of each field. The horizontal and vertical deflecting means conveniently includes a saw-tooth generator of conventional specifications, and each such unit is designed and proportioned to produce its deflecting scan controls at proper rate of scanning (15.750/sec., for the horizontal scans, and 60/sec., for the vertical deflections). Such scanning operations and units for producing them, are well known in the arts, so further detailed explanation thereof is not needed here.

The signals produced according to such scans are ultimately delivered to the Television Signal Emitter 18 by which they are conditioned for delivery to the antenna 19 in conventional manner.

Synchronizing signals are regularly produced by the unit 20, and such signals are transmitted or used to control various of the related functions, according to conventional practice. In each of the three showings I have also included a microphone 21 which is connected to the corresponding unit 18 with inclusion of a needed conditioning unit 22 in such connections to enable translating the audio signals from such microphone to radio or other frequency, for inclusion in the emitted radio frequency signals of the frequency specified for the sending station in question. The units 23 and 24 are included between the horizontal deflector unit 14 and the synchronizing signal unit 20, and between the vertical deflector unit 15 and the synchronizing signal unit 20, respectively, as part of the needed deflection controls and activating elements.

Included in the connections between the horizontal deflecting means 14 and the synchronizing unit 20 is a unit 25. This unit includes means constituted to produce periodic reversal of the direction of scan of the beam horizontally, so that such beam shall produce its effective scanning operation either left-to-right, or right-to-left, as the case may be. If the conventional direction of such scan is left-to-right, then the unit 25 will produce reversals of the direction of scan, as by reversing the terminal connections of the saw-tooth generator intermittently. Conventionally, the circuitry is so designed as to provide a short transfer interval at conclusion of each cross scan, in which case the terminating and commencing ends of successive scans are not directly connected together, the beam being "jumped" from the terminal end of each scan to the beginning end of the successive scan.

The unit 25 is connected to the synchronizing unit 20 and such two units are so designed that the reversals of scan direction produced by the unit 25 will be produced as each scan is completed; or will be produced as each group of scans is completed. For example, when one group comprises the scans of the main field of a frame (263 scans), and the next group comprises the scans of the interlace field of such frame (262 scans), then the units 20 and 25 are designed and proportioned in their circuitry to produce corresponding reversals of the scan direction. If desired, another unit 26 may be included in the connections between the reverser unit 25 and the horizontal deflector means 14, such unit 26 being, for example, an amplifier.

Means are provided in connection with the unit 25 to control activation or non-activation of such unit. When under one such condition (activation or non-activation) the unit 25 does not act to produce the scan direction reversal—when under another such condition (non-activation or activation) the unit 25 performs its intended function of producing successive reversals of the direction of scan. Thus, such unit 25 (and the unit 20) are designed and so interconnected as to produce activation of the unit 25 at conclusion of the scan or group of scans, as the case may be, under control of the control unit. When such control unit is conditioned to cause the unit 25 to produce the desired and intended rate of reversals, such reversals will occur as intended, either at completion of each cross scan, or at completion of each group of such cross scans, as the case may be.

In each of FIGURES 1, 2 and 3, such activation control is produced by means of the switch unit, comprising the solenoid operated switch 27 having the contacts 28 and 29, one of which, 29, is connected to the unit 25. Upon energizing such solenoid switch, potential will be delivered to the unit 25 over the line 30, and such delivery will continue as long as such switch remains in its closed position, thus also causing the reversals of scan direction to continue as long as such switch remains closed.

Additionally, the embodiments shown in FIGURES 2 and 3 include schematic showings of means to produce the video signals, and emittion of such signals, according to a conventional showing of such means. This includes the dichroic elements for delivering the color components to the three color signal translators, 31, 32 and 33 for the red, green, and blue-violet components, respectively. These deliver their color component intensities to the units 34, 35, and 36, respectively. From such last defined units such intensities are brought into conventional relation by the schematic showing 37, and thence delivered to the unit 18, together with proper delivery of the synchronizing signals to be emitted over the antenna.

The receivers shown schematically in FIGURES 1, 2, and 3 include the horizontal and vertical deflection units 38 and 39, respectively. These produce the horizontal and vertical deflections under proper synchronous control produced by translation of the received synchronizing signals, the synchronizing unit 40 being provided for this purpose. The units 41 and 42' are provided for producing and delivering the necessary deflection signals to the units 38 and 39 under synchronizing control. Proper connections are provided between such units 41 and 42', and the corresponding units 38 and 39, for causing desired deflections to occur.

The connections just referred to, between the unit 41 and the horizontal deflection unit 38 include the reversal producing unit $42^a$ or $42^b$ or $42^c$, as the case may be. Such unit is constituted to respond to the received synchronizing signals in manner to produce reversals of the connections to the corresponding deflection unit 38 in exact harmony with the reversals produced by the unit 25 of the sending station, so that such unit 42 is reversed each time the sending station unit 25 is reversed, and such reversal of the unit 42 continues during the duration of the reversal of the unit 25, with termination of such reversal when the reversal of the unit 25 terminates. The connection 43 between the unit 42 and the synchronizing unit 40 delivers signals to such unit 42 corresponding in this respect to the connection between the reverser unit 25 at the sending station and the synchronizing unit 24 of such sending station.

The reverser unit 42 includes means to activate such unit to cause it to reverse the connections to the horizontal deflection unit, and to maintain such reversed condition as long as such activation continues. Such activation is produced by electrification over the line 44 from the switch 45. The solenoid 46 of such switch receives electrification over the line 47, so that as long as such line 47 is electrified the unit 42 is activated. When thus activated, the horizontal deflection directions are harmonized with the horizontal deflection directions then being produced at the sending station, both as to time and interval, and as to direction.

Suitable means may be provided for electrifying the line 47 to cause such harmonizing condition to be produced and continued. In the embodiments shown in all of the FIGURES 1, 2, and 3, I have provided such means in the form of pre-pay or alternately, remote control means. The pre-pay means includes the coin or token receiving unit 48 which is normally open-circuited. The remote control means includes the relay 49, having the solenoid 50, such relay being normally open-circuited, but bridging its contacts 51 and 52 when such solenoid is energized. A line 53 extends to the remote control station where it terminates in a plug which may be inserted into a jack-plate 54, which plate is electrified so that upon insertion of the plug into a corresponding jack, potential will be delivered over such line 53 to the solenoid. Thus the activation of the unit 42 for reversing purposes may be effected either by coin-box pre-pay or by remote control operation; and such activation will continue as long as the pre-pay unit remains in closed circuit condition, or as long as the remote control operation is continued. The coin-box may be of that type which includes a time limit operation, corresponding to the denomination of the inserted coin or coins.

Each of FIGURES 1, 2, and 3 also includes a showing of recording means constituted to record the time of use of the aforementioned pre-pay or remote control operation. Such recording means includes the tape recorder 55. Since such recorder means is also shown in said issued patent, No. 3,070,652, and also in various divisional and also original applications, it is unnecessary to describe it here in further detail.

The following comments respecting operation of the foregoing embodiments are pertinent:

Normally each of the reverser units 25 (sending station), and 42 (receiver) remains unactivated, so that horizontal deflection of the beam remains unchanged from its conventional direction of scan (presently left-to-right). Thus, normally the receiver will produce all of its horizontal deflections or scans in the same direction as the normal direction of scan at the sending station. Accordingly, each scan producing a raster component will be produced by a lateral deflection in the same direction as all of the other scans, which, when such direction is the same as the direction of scan at the sending station, will produce a right-hand raster and picture of the replicated object. This is the normal operational condition and occurs when neither of the reverser units 25 or 42 is activated.

Next: If the reverser unit 25 of the sending station be activated, then every other scan or group of scans signalled by such sending station will be produced in direction opposite to the normal or conventional direction of scan. If, under such changed condition of scanning at the sending station, the directions of all the scans produced at the receiver remain unchanged, it is evident that there will be produced a less than perfect translation, and a less than perfect picture will be produced. If, while such reversed scanning condition and direction at the sending station be continued, and if during such continuance the unit 42 of the receiver be activated, under control of the received control signals being emitted by the sending station, the scans produced by the receiver will follow, directionally, the scans being produced at the sending station, so that now a correct relation of each scan to all other scans of the raster, will be produced, and a perfect replication of the scanned object will be produced on the raster. If the activation of the receiver unit 42 be terminated prior to termination of the activation of the unit 25 in the sending station, the picture produced will again become one of less than perfection. Or again, if the activation of the unit 25 in the sending station be terminated without corresponding termination of the activation of the receiver unit 42, a less than perfect picture will also be produced.

Since the activation of the unit 42 of the receiver is under control of the operator of such receiver, it is seen that he has it under his control to either accept a less than perfect translation of the received program, or to bring the translaion produced by his receiver into perfect form, but only by pre-pay at the coin or token box, or by proper plug-in at the remote control station, produced by the attendant at such station, who may make a record of the use of the corresponding subscriber receiver during emittion of the program in question. In either case a tape recording will also be produced during, and as long as, the operator of the receiver complies with the preconditions under which desired perfect picture is include slight variations from absolutely straight lines produced.

It is also noted that in each of the schematic showings of FIGURES 1, 2, and 3, I have included the showing of a speaker 56, having the customary volume control button 57. The volume of sound produced by the speaker conventionally depends on the potential delivered to such speaker by such volume control.

The reverser units 25 and 42 may be of construction suitable to produce the intended reversals with sustaining of the reversed position long enough to assure completion of the scan or scans which are to be executed in reversed direction.

Accordingly, such reverser units may be either electronic or mechanical in structure; but generally an electronic unit will be required, due to the high rate of operations of such units. As an example of a unit which will produce reversals at incoming of succesive impulses, with sustaining of the reversed condition after each impulse is received, and until arrival of the next impulse, I mention the schematic showing of the unit 603 carried on sheet 1 of the drawings of Letters Patent of the United States, No. 3,096,469, issued to me July 2, 1963, for improvements in Instruments for Controlling Operations to Ensure Optimum Operating Conditions, together with the description of the structure and operations of such unit contained in the specification of that patent. Such reference is made merely by way of illustration of a unit which is capable of producing the intended reversals with sustained position at the reversed condition, after each impulse is received and until receipt of the succeeding impulse.

It is intended that the expression "scan" or "linear scan" shall be interpreted to include various forms of lateral travel of the scanning beam of the sending station across the object being replicated, and, in the case of the receiver, to include various forms of lateral travel of the scanning beam or beams across the viewing surface or the excitable phosphor surface of the receiver, for production of the raster either in monochrome, or in color lineated form, or in three color dot array form; and to include slight variations from absolutely straight lines across the viewing surface, as long as the scans are executed in substantially linear manner across the surface.

I claim:

1. In a television system, a signal producing and emitting sending station which includes means constituted to produce and emit signals which correspond to scanning a viewed object according to a pre-determined spatial and time pattern, which pattern includes successive parallel scans which are successively directionally related to each other according to a pre-determined first defined sending station directional sequence; a raster producing receiver including means to receive and translate and produce on a viewing surface successive parallel scans of a spatial and time sequence the same as the spatial and time sequence of the scans and the signals emitted by the sending station, and which receiver produced scans are successively directionally related to each other according to a pre-determined first defined receiver directional sequence the same as the first defined sending station directional sequence; together with means in connection with the signal producing and emitting means of the sending station, constituted to change the directional sequence of the scans produced by said signal producing and emitting means to a second defined sending station directional sequence; and means in connection with the receiver under operator control constituted to change the directional sequence of the scans produced on said viewing surface to a second defined receiver directional sequence the same as the second defined sending station directional sequence.

2. A television system as defined in claim 1, wherein the sending station directional sequence changing means comprises scan direction reversal producing means and includes means constituted to activate said reversal producing means to reverse the direction of scan production at conclusion of each of successive groups of scans.

3. A television system as defined in claim 2, wherein each group of scans includes the scans of a field of a frame of scans.

4. A television system as defined in claim 2, wherein the receiver directional sequence changing means includes means constituted to reverse the direction of scans produced on the viewing surface at conclusion of successive groups of scans corresponding to the groups of scans reversed by the scan direction reversal producing means of the sending station, synchronously with reversal of the direction of scans by reversal of the scan direction producing means of the sending station.

5. A television system as defined in claim 4, wherein the operator control means which is constituted to change the directional sequence of the scans produced on the viewing surface, comprises a coin box control unit.

6. A television system as defined in claim 4, wherein the operator control means which is constituted to change the directional sequence of the scans produced on the viewing surface, comprises a remote control device.

7. A television system as defined in claim 1, wherein the means to receive and translate and produce on a viewing surface of the receiver, the parallel scans, is constituted to produce on said viewing surface a monochrome raster.

8. A television system as defined in claim 1, wherein the means to receive and translate and produce on a viewing surface of the receiver, the parallel scans, is constituted to produce on said viewing surface a color linear raster.

9. A television system as defined in claim 1, wherein the means to receive and translate and produce on a viewing surface of the receiver, the parallel scans, is constituted to produce on said viewing surface a three color dot array raster.

References Cited

UNITED STATES PATENTS 2,757,226 7/1956 Zworykin ------------ 178—5.1

ROBERT L. GRIFFIN, *Primary Examiner.*

JOHN W. CALDWELL, *Examiner.*

H. W. BRITTON, *Assistant Examiner.*